M. O. REICHE.
APPARATUS FOR DETERMINING THE PERCENTAGE OF LIME IN MATERIALS.
APPLICATION FILED MAR. 8, 1913.
1,156,176.
Patented Oct. 12, 1915.
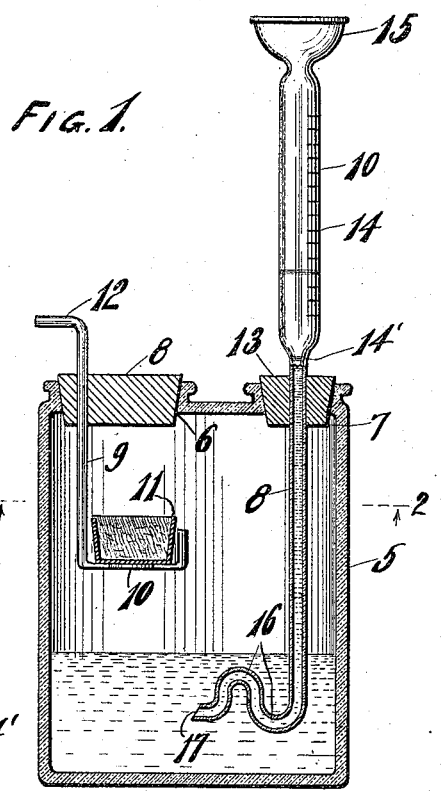
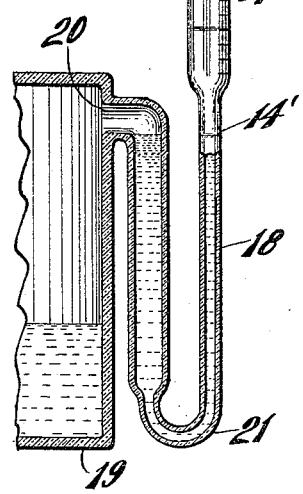
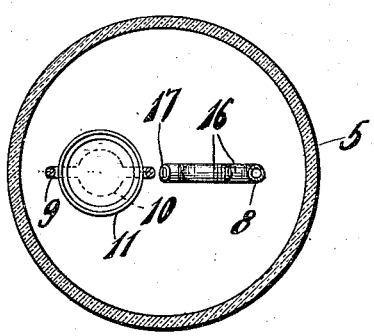
WITNESSES.
INVENTOR.
Max O. Reiche,
By Morsell & Caldwell
ATTORNEYS.

UNITED STATES PATENT OFFICE.

MAX O. REICHE, OF MILWAUKEE, WISCONSIN.

APPARATUS FOR DETERMINING THE PERCENTAGE OF LIME IN MATERIALS.

1,156,176. Specification of Letters Patent. Patented Oct. 12, 1915.

Application filed March 8, 1913. Serial No. 752,952.

*To all whom it may concern:*

Be it known that I, MAX O. REICHE, a subject of the Emperor of Germany, and a resident of Milwaukee, in the county of Milwaukee and State of Wisconsin, have invented new and useful Improvements in Apparatus for Determining the Percentage of Lime in Materials, of which the following is a description, reference being had to the accompanying drawings, which are a part of this specification.

This invention relates to improvements in apparatus for determining the percentage of lime in materials and more particularly in soils.

It is of great advantage to the farmer to understand the nature of the soil of his farm in order to regulate the fertility and productiveness of the soil to get the maximum results.

Carbonate of lime existing in fertile soils is a most important factor in releasing latent plant food such as potash, phosphoric acid and nitrates, and also improves the texture of the soil, making light soils more compact and heavy soils more porous. The lime also corrects acidity and provides favorable conditions for germ life and also serves to destroy toxins or poisons which retard or prohibit plant growth. It is, therefore, of the greatest importance for any farmer to be able to test his soil and to determine whether or not the soil contains a proper percentage of lime to promote the maximum plant growth without impoverishing the soil and interfering with its future productiveness.

It is one of the objects of this invention to provide an apparatus for determining the percentage of lime in soils and other materials whereby a person unskilled in chemistry may accurately determine the percentage within a few minutes' time and in a very simple manner.

A further object of the invention is to provide an apparatus for determining the percentage of lime in materials which is of very simple construction and consists of the minimum number of parts.

With the above and other objects in view, the invention consists of the improved apparatus for determining the percentage of lime in materials and its parts and combinations as set forth in the claims, and all equivalents thereof.

In the accompanying drawing in which the same reference characters indicate the same parts in all of the views: Figure 1 is a vertical sectional view of the improved apparatus for determining the percentage of lime in materials; Fig. 2 is a sectional view thereof taken on line 2—2 of Fig. 1; and Fig. 3 is a modified form of apparatus.

Referring to the drawing the numeral 5 indicates the gas generating receptacle or vessel of the improved apparatus which may be formed of glass or any other material desired and is provided with a charging opening 6 and an opening 7 through which extends the graduated gas tube or measuring device 8. The charging opening is provided with a rubber stopper 8 having an angular rod 9 extending therethrough which is provided with a flattened portion 10 for holding the small cup 11 thereon. The upper end of the arm is bent at right angles to form a turning arm 12 for the rod. The rod extends into the receptacle to a point approximately one half the height of the receptacle and the flattened portion of the rod is adapted to temporarily hold the cup while the receptacle is being hermetically sealed by means of the stopper 8.

The graduated tube extends through a rubber stopper 13 which is inserted in the tube opening 7 and the upper enlarged portion 13 having a series of graduations 14 delineated thereon which indicate the columnar height of the water and the percentage of lime in a given quantity of material.

The upper end of the tube is open and is provided with a funnel shaped enlargement 15 for convenience in pouring water or diluted acid into the tube. The lower end portion of the tube extends at right angles with a double curve in the horizontal portion to form a water trap 16 to prevent the escape of gas through the tube and also to prevent the tube clogging up with the material being tested. The lower open end 17 of the tube is beveled off to prevent the entrance of gas which is being generated at the bottom portion of the receptacle. A graduation mark 14′ is delineated on the tube to indicate the height for filling with water or diluted acid.

In the modified form the graduated tube 18 is positioned entirely outside of the receptacle 19 and is in communication therewith through the opening 20 provided in the upper side portion of the receptacle. From this opening the tube extends downwardly to a bend 21 in alinement with the bottom portion of the receptacle and then extends upwardly and is shaped and graduated in the same manner as the tube first mentioned.

In use the receptacle is charged with a predetermined amount of diluted hydrochloric acid and the cup is filled with twenty grams of air dry earth or other material and placed on the flattened portion of the angular rod. The rod and cup are then inserted into the receptacle and the receptacle is hermetically sealed by the stopper which holds the rod. Water or diluted acid is now poured into the funnel of the tube until the tube is filled up to the first graduation mark and the cup of earth is then upset into the water and the hydrochloric acid within the receptacle by turning the rod so that the cup will strike against the side wall of the receptacle and upset the cup. The soil or other material will become disintegrated by contact with the hydro-chloric acid and a carbonic acid gas will be developed from the carbonate of lime of the soil through the counter-action of the hydro-chloric acid. The resultant gas will exert a pressure on the water or diluted acid and raise the water level in the tube to register the percentage of lime indicated by the test.

The apparatus is designed to register one-tenth to one per cent. of lime in soils, and as four-tenths of one per cent. of lime in ordinary soil is considered a sufficient quantity for an average productiveness the graduation indicating this point on the tube is formed of a distinctive color, such as red, to enable the person using the apparatus to quickly see whether or not the soil is provided with the proper percentage of lime.

While this apparatus is designed for testing twenty grams of air-dried soil it is obvious that other material such as baking powder, fertilizers, marl and agricultural lime may be tested in one gram amounts by multiplying the result by twenty.

From the foregoing description it will be seen that the apparatus is well adapted for the purpose desired.

What I claim as my invention is:

1. Apparatus for determining the percentage of lime in materials, comprising a gas generating receptacle having a charging opening provided therein, a graduated gas indicating tube connected to said receptacle, a stopper for the charging opening, a cup holder carried thereby, and a cup carried by the holder.

2. Apparatus for determining the percentage of lime in materials, comprising a gas generating receptacle having a charging opening provided therein, a graduated gas indicating tube connected to the receptacle and extending therein to a point adjacent to the bottom portion of said receptacle, said tube having a gas sealing trap provided at its lower end portion, a stopper for the charging opening, a cup holder extending through the stopper, and a cup for the holder which may be moved to discharge its contents into the receptacle when the stopper is covering the charging opening.

In testimony whereof, I affix my signature, in presence of two witnesses.

MAX O. REICHE.

Witnesses:
C. H. KEENEY,
EMILY SCHOWALTER.

Copies of this patent may be obtained for five cents each, by addressing the "Commissioner of Patents, Washington, D. C."